United States Patent
Fujii et al.

(10) Patent No.: US 10,196,025 B2
(45) Date of Patent: Feb. 5, 2019

(54) SEATING DETECTION METHOD AND SEATING DETECTION DEVICE

(71) Applicant: AISIN SEIKI KABUSHIKI KAISHA, Kariya-shi (JP)

(72) Inventors: Hiroyuki Fujii, Kariya (JP); Takahiro Izuno, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/622,095

(22) Filed: Jun. 14, 2017

(65) Prior Publication Data

US 2017/0369017 A1   Dec. 28, 2017

(30) Foreign Application Priority Data

Jun. 23, 2016 (JP) ................................. 2016-124978

(51) Int. Cl.
   *B60R 21/015*     (2006.01)
   *B60N 2/00*       (2006.01)

(52) U.S. Cl.
   CPC .......... *B60R 21/0152* (2014.10); *B60N 2/002* (2013.01)

(58) Field of Classification Search
   CPC .... B60N 2/002; B60R 21/01516; G01L 5/103
   See application file for complete search history.

(56) References Cited

U.S. PATENT DOCUMENTS

| 7,162,344 B2 * | 1/2007 | Kojima | B60N 2/002 180/273 |
| 2003/0150283 A1 * | 8/2003 | Stanley | G01L 5/103 73/862.391 |
| 2004/0149507 A1 * | 8/2004 | Baskin | B60N 2/002 180/271 |
| 2008/0191856 A1 * | 8/2008 | Hetzenecker | B60R 21/01516 340/457 |

FOREIGN PATENT DOCUMENTS

| JP | 2005-153556 | 6/2005 |
| JP | 2005-315745 | 11/2005 |

* cited by examiner

*Primary Examiner* — Yuri Kan
(74) *Attorney, Agent, or Firm* — Oblon, McClelland, Maier & Neustadt, L.L.P.

(57) ABSTRACT

A seating detection method includes: detecting whether a seat belt sensor in a vehicle seat is in an ON state or an OFF state; detecting whether a pressure sensitive sensor in a seat skin constituting a seating surface is in an ON state or an OFF state; and determining a foreign object insertion state in which a foreign object is inserted between the seating surface and a child seat based on whether the seat belt sensor is in the ON state or the OFF state and whether the pressure sensitive sensor is in the ON state or the OFF state. When the pressure sensitive sensor is changed from the ON state to the OFF state in a state in which the seat belt sensor is maintained in the ON state after the seat belt sensor is changed to the ON state, it is determined as the foreign object insertion state.

7 Claims, 5 Drawing Sheets

SEATING DETECTION METHOD AND SEATING DETECTION DEVICE

CROSS REFERENCE TO RELATED APPLICATIONS

This application is based on and claims priority under 35 U.S.C. § 119 to Japanese Patent Application 2016-124978, filed on Jun. 23, 2016, the entire contents of which are incorporated herein by reference.

TECHNICAL FIELD

This disclosure relates to a seating detection method and a seating detection device.

BACKGROUND DISCUSSION

In the related art, there has been a seating detection device that determines a state in which an occupant is seated on a seating surface based on an ON/OFF state of a membrane switch disposed inside a seat skin that constitutes a seat surface (the seating surface) of a seat cushion.

For example, a seating detection device disclosed in JP 2005-153556A (Reference 1) is provided with a membrane switch having a plurality of pressure sensitive switch units (cells). Specifically, the membrane switch is configured in a manner in which the membrane switch is disposed inside the seat skin such that respective pressure sensitive switch units are disposed to be spaced apart from one another along the seating surface. In addition, the membrane switch is configured to be in an ON state when at least two pressure sensitive switch units among the respective pressure sensitive switch units are simultaneously in an electric conduction state. Therefore, the membrane switch is configured to avoid the occurrence of incorrect detection (for example, determining baggage or the like placed on the seating surface as an occupant).

In addition, a pressure sensitive sensor such as the membrane switch is typically disposed in a central portion of the seating surface, which corresponds to a hip point of the occupant, in order to ensure that a seating state of an occupant is determined. In contrast, in many cases, a child seat has a larger lower surface than an occupant seating portion. Further, in most instances, side support portions, each having a bulging shape, are provided at both end portions in a width direction of the seat cushion. That is, in the case of most of the seating surfaces, the height of the central portion of a seating surface where the pressure sensitive sensor is provided is lower than those of peripheral portions. Further, with the aforementioned configuration, most of seating detection devices are configured in a manner in which the pressure sensitive switch unit is not turned into the ON state even in a case in which an occupant (child) is seated on the child seat mounted on the seat.

In a case in which a foreign object (e.g., a toy or a lighter) is inserted into a gap between a seating surface and a child seat, the seating surface is likely to be pressed by the foreign object. Therefore, because a pressure sensitive switch unit is turned into the ON state when an occupant is seated on the child seat, there is a likelihood that an error will occur in respect to seating detection and determination.

Thus, a need exists for a seating detection method and a seating detection device which are not susceptible to the drawback mentioned above.

SUMMARY

It is preferable that a seating detection method according to an aspect of this disclosure includes: detecting whether a seat belt sensor provided in a seat of a vehicle is in an ON state or an OFF state; detecting whether a pressure sensitive sensor configured to be provided inside a seat skin constituting a seating surface of the seat is in an ON state or an OFF state; and determining a foreign object insertion state in which a foreign object is inserted between the seating surface and a child seat based on whether the seat belt sensor is in the ON state or the OFF state and whether the pressure sensitive sensor is in the ON state or the OFF state, in which, when the pressure sensitive sensor is changed from the ON state to the OFF state in a state in which the seat belt sensor is maintained in the ON state after the seat belt sensor is changed to the ON state, it is determined as the foreign object insertion state.

It is preferable that a seating detection device according to an aspect of this disclosure includes: a buckle engagement detecting unit that detects whether a seat belt sensor provided in a seat of a vehicle is in an ON state or an OFF state; a seating detecting unit that detects whether a pressure sensitive sensor configured to be provided inside a seat skin which constitutes a seating surface of the seat is an ON state or an OFF state; and a foreign object insertion determining unit that determines a foreign object insertion state in which a foreign object is inserted between the seating surface and a child seat based on whether the seat belt sensor is in the ON state or the OFF state and whether the pressure sensitive sensor is in the ON state or the OFF state, in which, when the pressure sensitive sensor is changed from the ON state to the OFF state in a state in which the seat belt sensor is maintained in the ON state after the seat belt sensor is changed to the ON state, it is determined as the foreign object insertion state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of a seating detection method and a seating detection device will be described with reference to the drawings.

Figure 1:
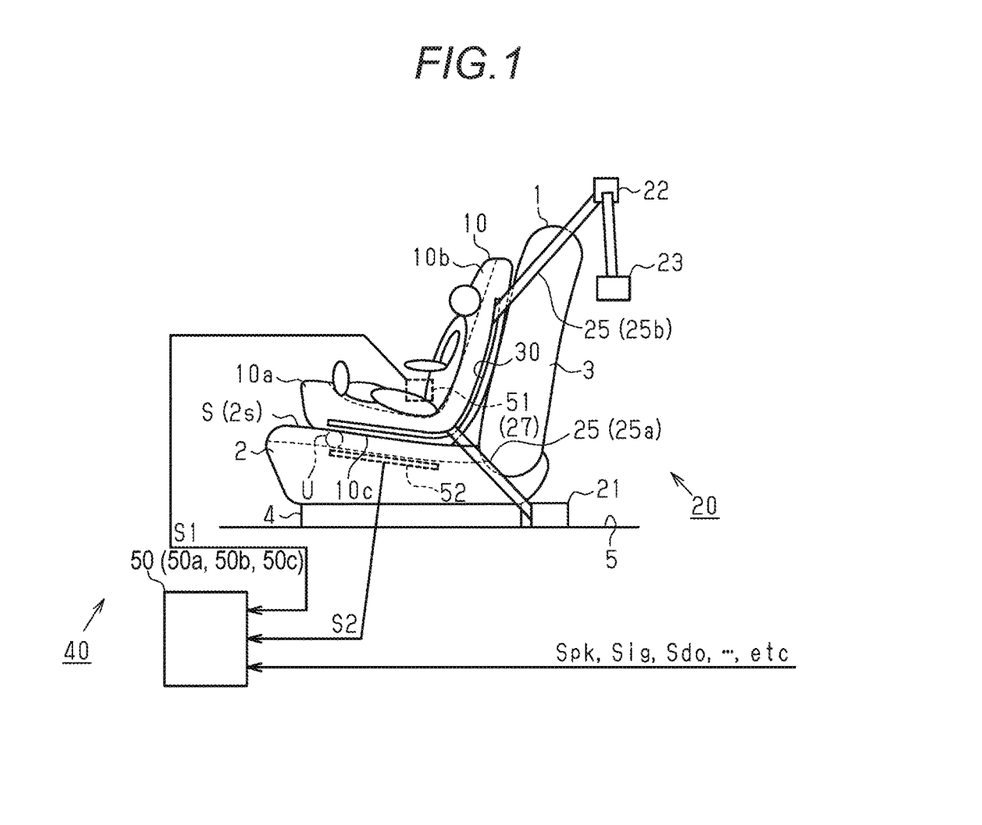
FIG. 1 is a view (side view) schematically illustrating a configuration of a seat on which a child seat is mounted, a seat belt device, and an occupant detection device.

As illustrated in FIG. 1, a seat 1 for a vehicle includes a seat cushion 2 which constitutes a seating surface S, and a seatback 3 which is provided at a rear end portion of the seat cushion 2. In addition, in the vehicle according to the exemplary embodiment, the seat 1 is fixed to a floor 5 of the vehicle through a support member 4 such as a slide rail or a bracket. Further, FIG. 1 illustrates a child seat (child restraint system (CRS)) 10 mounted on the seat 1.

Figure 2:
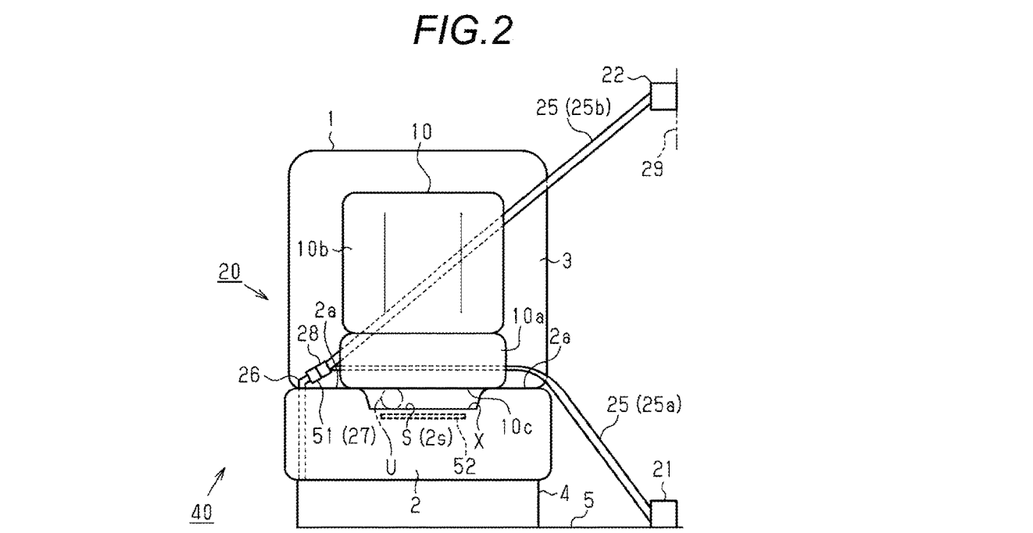
FIG. 2 is a front view schematically illustrating the seat on which the child seat is mounted, and the seat belt device.

As illustrated in FIG. 2, in the seat cushion 2 of the seat 1 of the exemplary embodiment, an occupant seating portion X is provided at a position corresponding to a hip point of an occupant, that is, in a central portion of the seating surface S in a vehicle width direction. In addition, side support portions 2a, which are formed to bulge upward, are provided at both ends of the seat cushion 2 in the vehicle width direction. That is, the occupant seating portion X has a lower height than the side support portions 2a in order to accommodate the occupant's hips. Further, the seat 1 of the exemplary embodiment is configured such that the lower surface 10c of the child seat 10 abuts on the side support portions 2a in a case in which the child seat 10 is mounted on the seating surface S.

In detail, as illustrated in FIGS. 1 and 2, in the vehicle of the exemplary embodiment, a seat belt device 20 attached to the seat 1 has a seat belt 25 of which one end is locked by an outer lap anchor 21 and the other end is connected to a belt retractor 23 through a through type shoulder anchor 22. In addition, a tongue plate 28, which is detachably engaged with a buckle 27 provided on an inner lap anchor 26, is provided in the middle of the seat belt 25. In addition, in the exemplary embodiment, the outer lap anchor 21 and the shoulder anchor 22 are fixed to a vehicle body (the floor 5 and a sidewall portion 29 of the vehicle body), and the inner lap anchor 26 is fixed to the support member 4 of the seat 1. Therefore, the seat belt device 20 of the exemplary embodiment has a configuration of a so-called three-point seat belt device, which uses the respective seat belt anchors (21, 22, and 26), which are provided at the three points, as support points.

In addition, in the seat belt device 20 of the exemplary embodiment, the belt retractor 23 is configured such that in a case in which the drawing-out of the seat belt 25 is stopped along the way, the belt retractor 23 restricts the operation of the seat belt 25 in the extension direction at the position of the seat belt 25 and permits only the operation of the seat belt 25 in the winding direction. Further, the child seat 10 of the exemplary embodiment is configured to be fixed to the seat 1 using the function of an "automatic locking retractor (ALR)" mounted in the seat belt device 20.

In more detail, the child seat 10 of the exemplary embodiment has a belt insertion hole 30 which penetrates a seat cushion 10a and a seatback 10b in the width direction. Further, the seat belt 25 is inserted into and through the belt insertion hole 30 when the child seat 10 is mounted on the seat 1.

Specifically, in this case, a lap strap portion 25a of the seat belt 25 is inserted into and through the seat cushion 10a side portion of the belt insertion hole 30, and a shoulder strap portion 25b is inserted into and through the seatback 10b side portion of the belt insertion hole 30. In addition, the tongue plate 28 of the seat belt 25, which is drawn out from the belt insertion hole 30, is engaged with the buckle 27 provided at an inner side of the seat 1 (an inner side in the vehicle width direction), as in a case in which an occupant is seated on the seat 1. Further, in this state, the child seat 10 of the exemplary embodiment is configured to be bound onto the seat 1 by fastening the seat belt 25 using the ALR function.

(Seating Detection Device)

Next, a configuration of a seating detection device mounted in the seat 1 for a vehicle will be described.

As illustrated in FIG. 1, a pressure sensitive sensor 52, which is turned into an ON state when the seat cushion 2, which constitutes the seating surface S, is pressed downward, is provided in the seat 1 of the exemplary embodiment. In the seat 1 of the exemplary embodiment, a membrane switch is used as the pressure sensitive sensor 52. In addition, the pressure sensitive sensor 52 is disposed inside a seat skin 2s that constitutes the seating surface S. Specifically, the pressure sensitive sensor 52 is disposed in the occupant seating portion X. That is, when the occupant is seated, the occupant's hips press the pressure sensitive sensor 52 such that an output signal S2 of the pressure sensitive sensor 52 of the exemplary embodiment is turned into the ON state. In addition, in a case in which the pressure sensitive sensor 52 is not pressed (e.g., nothing is placed on the seating surface S), the output signal S2 of the pressure sensitive sensor 52 is turned into an OFF state. Further, in the vehicle of the exemplary embodiment, the output signal S2 of the pressure sensitive sensor 52 is input to an ECU 50.

When the pressure sensitive sensor 52 (the output signal S2 of the pressure sensitive sensor 52) is in the ON state, the ECU 50 of the exemplary embodiment determines that the occupant is seated on the seating surface S of the seat 1 (seating detection and determination). Therefore, a seating detection device 40 is formed in the seat 1 of the exemplary embodiment.

In addition, in the seat 1 of the exemplary embodiment, a seat belt sensor 51, which detects an engagement state between the tongue plate 28 of the seat belt 25 and the buckle 27, is provided in the buckle 27, which is engaged with the tongue plate 28 of the seat belt 25. Specifically, in a case in which the tongue plate 28 of the seat belt 25 is engaged with the buckle 27, an output signal S1 of the seat belt sensor 51 is turned into the ON state. In addition, in a case in which the tongue plate 28 of the seat belt 25 is not engaged with the buckle 27, the output signal S1 of the seat belt sensor 51 is turned into the OFF state.

Further, in the vehicle of the exemplary embodiment, the output signal S1 of the seat belt sensor 51 is also input to the ECU 50. Further, the ECU 50 of the exemplary embodiment is configured to use the output signal S1 of the seat belt sensor 51, in addition to the output signal S2 of the pressure sensitive sensor 52, for the seating detection and determination.

Further, in addition to the output signals S1 and S2 of the seat belt sensor 51 and the pressure sensitive sensor 52, an ignition signal Sig, a door opening and closing signal Sdo, a parking signal Spk for indicating that the vehicle is stopped, and the like are input to the ECU 50 of the exemplary embodiment. Further, the ECU 50 of the exemplary embodiment is configured to perform the seating detection and determination based on the various control signals.

Next, determination on foreign object insertion between the seating surface S and the child seat 10, which is performed by the ECU 50 of the exemplary embodiment, will be described.

Figure 3:
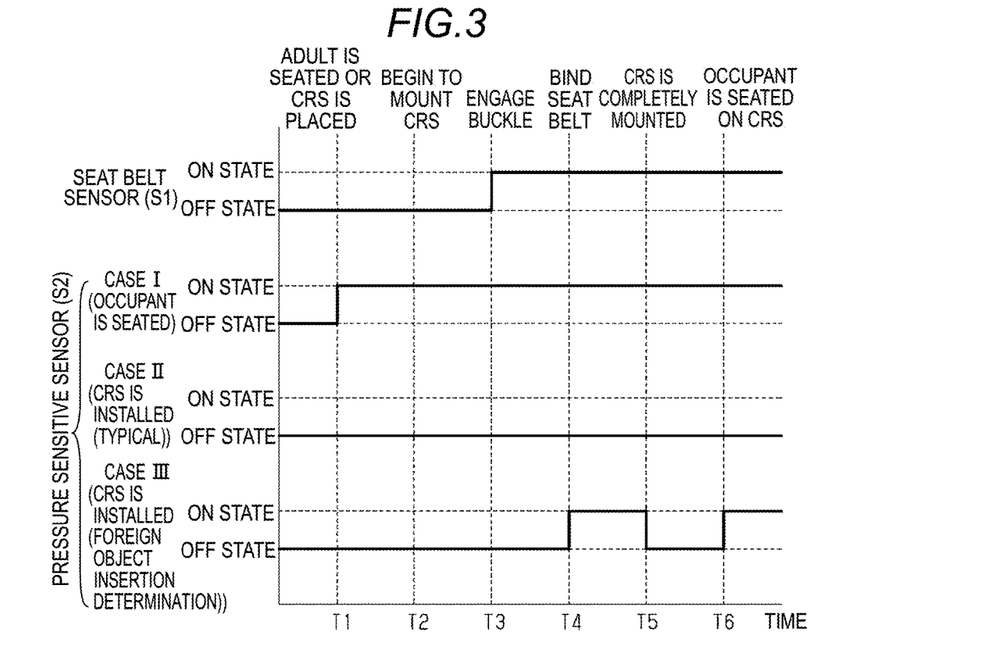
FIG. 3 is a time chart illustrating state changes of a seat belt sensor and a pressure sensitive sensor when an adult is seated on the seat and when the child seat is mounted on the seat.

As illustrated in FIG. 3, when an occupant (adult) is seated on the seat 1, the occupant's hips press the seating surface S (time T1). Therefore, the pressure sensitive sensor 52 (the output signal S2 of the pressure sensitive sensor 52)

is changed from the OFF state to the ON state. Thereafter, when the occupant seated on the seat 1 wears the seat belt 25, the tongue plate 28 of the seat belt 25 is engaged with the buckle 27 (time T3). Therefore, the seat belt sensor 51 (the output signal S1 of the seat belt sensor 51) is changed from the OFF state to the ON state. Further, in a case in which an adult occupant is seated on the seat 1 as described above (case I), the seat belt sensor 51 and the pressure sensitive sensor 52 are maintained in the ON state until the occupant leaves the seat 1.

Meanwhile, in a case in which the child seat 10 is mounted on the seat 1 (case II), an operator places the child seat 10 on the seating surface S of the seat 1 (time T1), and then begins to mount the child seat 10 on the seat 1 using the seat belt 25 (time T2). Specifically, the operator engages the tongue plate 28 of the seat belt 25 with the buckle 27 (time T3). Therefore, the seat belt sensor 51 is changed from the OFF state to the ON state. Next, the operator binds the child seat 10 by the seat belt 25 using the ALR function of the seat belt 25 (time T4). In this case, a load, which presses the seating surface S downward, is applied to the seat 1. However, in the seat 1 of the exemplary embodiment, the lower surface 10c of the child seat 10 is configured to abut on the side support portions 2a which are higher than the occupant seating portion X in which the pressure sensitive sensor 52 is disposed. For this reason, even in this case, the pressure sensitive sensor 52 still remains in the OFF state.

In addition, as the child seat 10 is completely mounted on the seat 1 (time T5), the load, which presses the seating surface S of the seat 1 downward, is decreased. Further, thereafter, an occupant (child) is seated on the child seat 10 completely mounted on the seat 1 (time T6). Therefore, the load, which presses the seating surface S of the seat 1 downward, is increased. Further, the pressure sensitive sensor 52 of the exemplary embodiment is configured to be maintained in the OFF state even in this case.

However, in a case in which a foreign object U is inserted (into a gap) between the lower surface 10c of the child seat 10 and the seating surface S (case III) when the child seat 10 is mounted on the seat 1, the ON/OFF state of the pressure sensitive sensor 52 is also changed.

Specifically, when the child seat 10 is bound by the seat belt 25 (time T4), the foreign object U inserted between the child seat 10 and the seating surface S presses the occupant seating portion X at the central portion of the seating surface S. Therefore, the pressure sensitive sensor 52 is changed from the OFF state to the ON state. In addition, thereafter, the child seat 10 is completely mounted on the seat 1 (time T5), and the load of the child seat 10, which presses the seating surface S downward based on the binding force of the seat belt 25, is decreased such that the pressure sensitive sensor 52 is changed from the ON state to the OFF state. Further, as the occupant (child) is seated on the child seat 10 (time T6), the load of the child seat 10, which presses the seating surface S downward, is increased. Therefore, the pressure sensitive sensor 52 is changed from the OFF state to the ON state.

Figure 4:
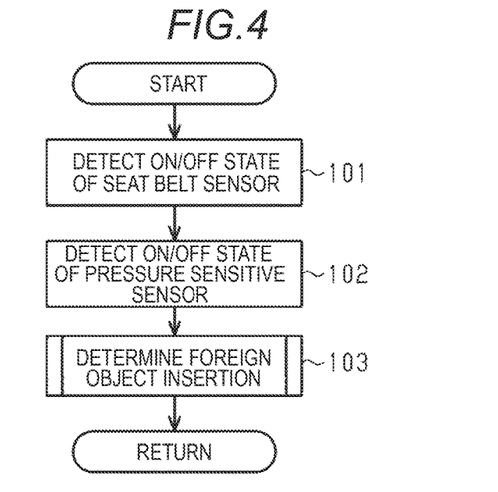
FIG. 4 is a flowchart illustrating a mode of determining foreign object insertion.

In view of this, as illustrated in a flowchart in FIG. 4, the ECU 50 of the exemplary embodiment first detects the ON state and the OFF state of the seat belt sensor 51 (step 101), and detects the ON/OFF state of the pressure sensitive sensor 52 (step 102). Further, based on the ON/OFF state of each of the seat belt sensor 51 and the pressure sensitive sensor 52, it is determined whether a foreign object U is inserted between the seating surface S and the child seat 10 mounted on the seat 1 (step 103, foreign object insertion determination).

Figure 5:
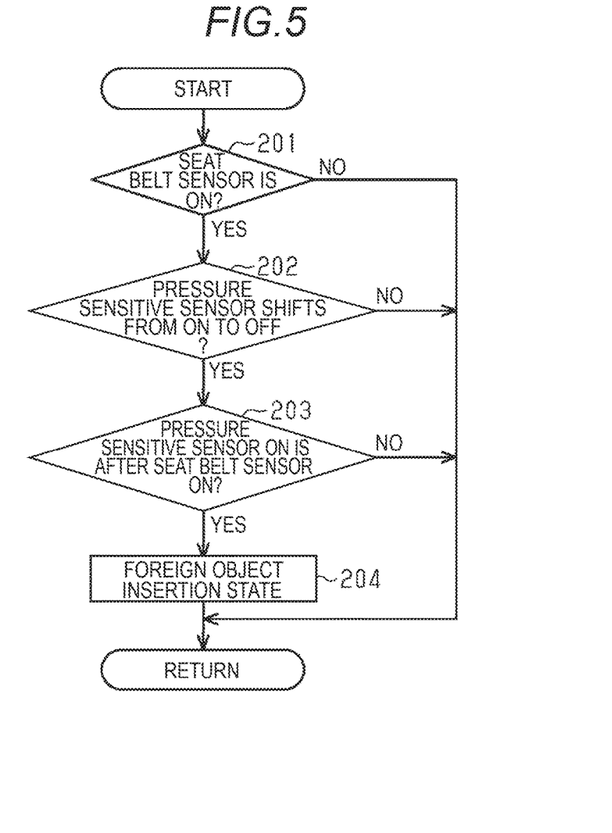
FIG. 5 is a flowchart illustrating a process procedure for determining foreign object insertion.

In detail, as illustrated in a flowchart in FIG. 5, regarding the foreign object insertion determination (see FIG. 4, step 103), the ECU 50 of the exemplary embodiment first determines whether the seat belt sensor 51 (the output signal S1 of the seat belt sensor 51) is in the ON state (step 201). In addition, when it is determined that the seat belt sensor 51 is in the ON state (step 201: YES), the ECU 50 subsequently determines whether the pressure sensitive sensor 52 (the output signal S2 of the pressure sensitive sensor 52) is changed from the ON state to the OFF state (step 202). Further, when it is determined that the pressure sensitive sensor 52 is changed from the ON state to the OFF state (step 202: YES), the ECU 50 of the exemplary embodiment determines whether the pressure sensitive sensor 52 is changed from the OFF state to the ON state after the seat belt sensor 51 is changed from the OFF state to the ON state (step 203). Further, when it is determined that the pressure sensitive sensor 52 is changed from the ON state to the OFF state after the seat belt sensor 51 is changed from the OFF state to the ON state (step 203: YES), the ECU 50 determines that the foreign object U is inserted between the seating surface S and the child seat 10 mounted on the seat 1 (step 204, foreign object insertion state).

Further, in step 203, when it is determined that the pressure sensitive sensor 52 is not changed from the ON state to the OFF state before the seat belt sensor 51 is changed from the OFF state to the ON state (step 203: NO), the ECU 50 of the exemplary embodiment does not perform the process of step 204. In addition, in step 202, when it is determined that the pressure sensitive sensor 52 is not changed from the ON state to the OFF state (step 202: NO), the ECU does not perform the processes of step 203 and step 204. Further, in step 201, when it is determined that the seat belt sensor 51 is not in the ON state (step 201: NO), the ECU does not perform the processes of steps 202 to 204.

According to the foregoing exemplary embodiment, the following operations and effects may be obtained.

(1) The ECU 50, which serves as a seating detecting unit 50a and a buckle engagement detecting unit 50b, detects the ON/OFF state of the seat belt sensor 51 (step 101), and detects the ON/OFF state of the pressure sensitive sensor 52 (step 102). Further, based on the ON/OFF state of each of the seat belt sensor 51 and the pressure sensitive sensor 52, the ECU 50, which serves as a foreign object insertion determining unit 50c, determines whether a foreign object U is inserted between the seating surface S and the child seat 10 mounted on the seat 1 (step 103, foreign object insertion determination). Further, regarding the foreign object insertion determination, the ECU 50 determines that a state in which the pressure sensitive sensor 52 is changed from the ON state to the OFF state (step 202: YES) in a state in which the seat belt sensor 51 is maintained in the ON state (step 201: YES) after the seat belt sensor 51 is changed to the ON state is the foreign object insertion state (step 204).

In the case of the foreign object insertion state in which the foreign object U is inserted between the child seat 10 and the seating surface S (case III), the pressure sensitive sensor 52 is changed from the OFF state to the ON state as the child seat 10 presses the seating surface S downward through the foreign object U when the child seat 10 is bound using the seat belt 25. Further, thereafter, the child seat 10 is completely mounted on the seat 1, and the load, which presses the seating surface S of the seat 1 downward, is decreased such that the pressure sensitive sensor 52 is changed from the ON state to the OFF state in a state in which the seat belt sensor 51 is in the ON state.

Meanwhile, in the case in which the adult occupant is seated on the seating surface S of the seat 1 (case I) and in the case in which the child seat 10 is mounted on the seat 1 in a state in which the foreign object U is not interposed (case II), the seat belt sensor 51 is maintained in the ON state, and the ON/OFF state of the pressure sensitive sensor 52 is not changed. That is, among the cases, only in the foreign object insertion state, the pressure sensitive sensor 52 is changed from the ON state to the OFF state in a state in which the seat belt sensor 51 is maintained in the ON state after the seat belt sensor 51 is in the ON state.

Therefore, with the configuration, by a simple configuration, it is possible to precisely determine the foreign object insertion state. Therefore, it is possible to more precisely detect the occupant by inhibiting incorrect detection.

(2) Further, when it is determined that the pressure sensitive sensor 52 is changed from the OFF state to the ON state after the seat belt sensor 51 is changed from the OFF state to the ON state (step 203: YES), the ECU 50 determines that the foreign object U is inserted between the seating surface S and the child seat 10 mounted on the seat 1 (step 204, foreign object insertion state).

In most instances, the operator, who mounts the child seat 10, binds the child seat 10 by the seat belt 25 in a state in which the tongue plate 28 of the seat belt 25 is engaged with the buckle 27. Therefore, the load, which presses the seating surface S of the seat 1 downward, occurs. That is, when the child seat 10 is mounted on the seat 1 in the foreign object insertion state, the timing at which the pressure sensitive sensor 52 is changed from the OFF state to the ON state frequently exists after the seat belt sensor 51 is changed to the ON state. Therefore, by adopting the configuration described above, it is possible to more precisely determine the foreign object insertion state.

Further, the exemplary embodiment may be changed as follows.

In the exemplary embodiment, regarding the foreign object insertion determination, it is determined whether the pressure sensitive sensor 52 is changed from the OFF state to the ON state after the seat belt sensor 51 is changed from the OFF state to the ON state (see FIG. 5, step 203). However, step 203 may not be necessarily provided.

Figure 6:
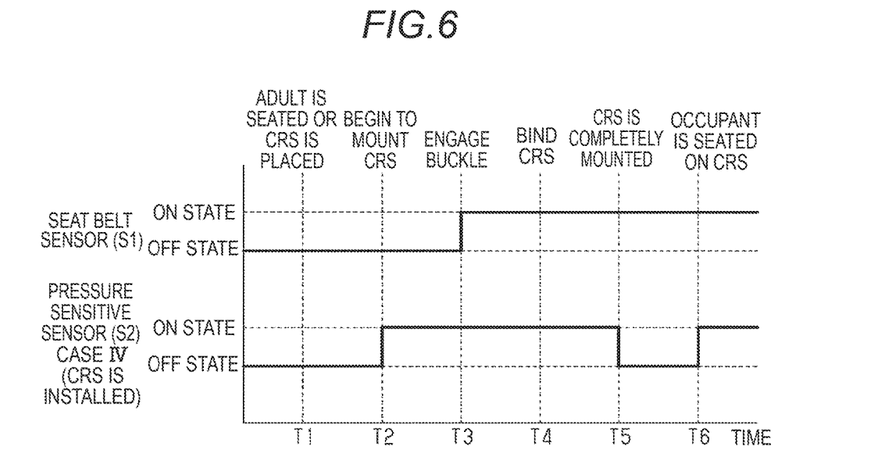
FIG. 6 is a time chart illustrating state changes of the seat belt sensor and the pressure sensitive sensor when an adult is seated on the seat and when the child seat is mounted on the seat according to another example.

That is, in some cases, as illustrated in FIG. 6, the pressure sensitive sensor 52 is changed from the OFF state to the ON state before a timing (time T3) when the tongue plate 28 on the seat 1 is engaged with the buckle 27 when the child seat 10 is mounted on the seat 1. Specifically, in some cases, an operation of pressing downward the child seat 10 mounted on the seating surface S may be performed before the tongue plate 28 is engaged with the buckle 27 (between time T2 and time T3) and after the operator begins to mount the child seat 10 (case IV). Further, in this case, the pressure sensitive sensor 52 is changed from the OFF state to the ON state before the seat belt sensor 51 is changed from the OFF state to the ON state.

However, by adopting the configuration, it is possible to determine the foreign object insertion state even in a case in which the order of mounting the child seat 10 on the seat 1 by the operator using the seat belt 25 varies. Therefore, it is possible to inhibit incorrect detection so that more precise occupant detection can be performed.

Figure 7:
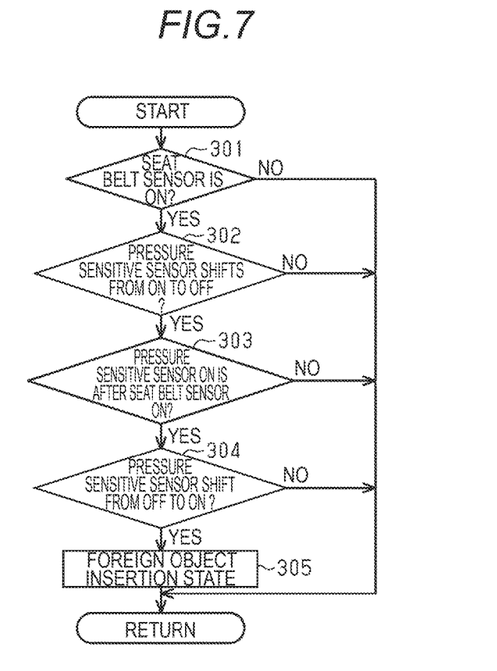
FIG. 7 is a flowchart illustrating a process procedure for determining foreign object insertion according to another example.

In addition, as illustrated in a flowchart in FIG. 7, it is determined that the pressure sensitive sensor 52 is changed from the ON state to the OFF state (step 302: YES) in a state in which the ON state is maintained (step 301: YES) after the seat belt sensor 51 is in the ON state, and then it is determined whether the pressure sensitive sensor 52 is changed from the OFF state back to the ON state (step 304). In addition, the processes of steps 301 to 303 in the flowchart in FIG. 7 are identical to the processes of steps 201 to 203 in the flowchart in FIG. 5. Further, in step 304, when it is determined that the pressure sensitive sensor 52 is changed from the OFF state to the ON state (step 304: YES), it may be determined that the foreign object U is inserted between the seating surface S and the child seat mounted on the seat 1 (step 305, foreign object insertion state).

As the occupant (child) is seated on the child seat 10 after the child seat 10 is completely mounted on the seat 1, the load of the child seat 10, which presses the seating surface S downward, is increased. Further, in this case, when the foreign object U is inserted between the child seat 10 and the seating surface S, the pressure sensitive sensor 52 is changed from the OFF state to the ON state (see FIG. 3, time T6).

Therefore, it is possible to more precisely determine the foreign object insertion state by continuously monitoring the state change of the pressure sensitive sensor 52 as described above.

Figure 8:
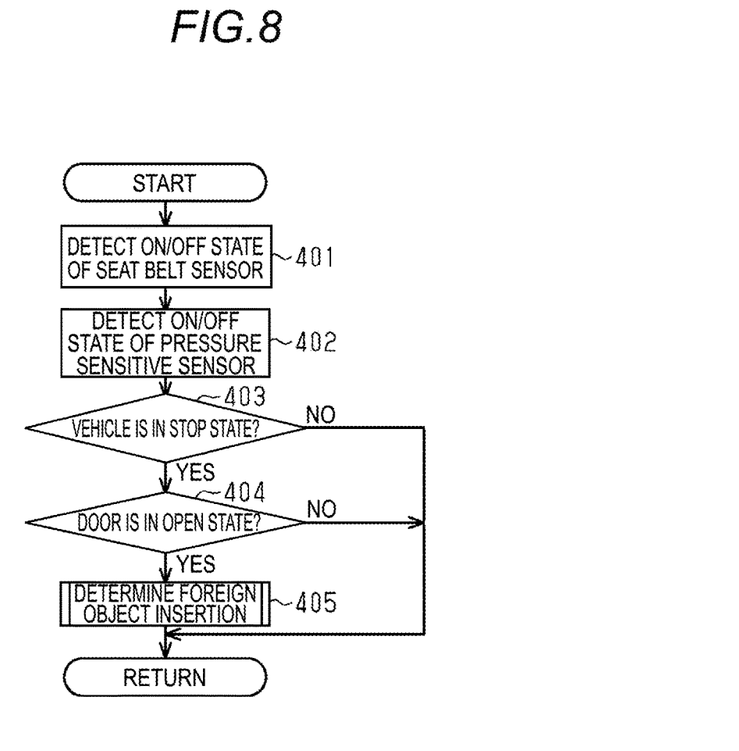
FIG. 8 is a flowchart illustrating a mode of detecting foreign object insertion according to another example.

In addition, other state determination in respect to the vehicle may be added to the condition for determining the foreign object insertion state. For example, as illustrated in a flowchart in FIG. 8, it is determined whether the vehicle is in a vehicle stop state and whether a vehicle door is in an open state (steps 403 and 404). Further, the foreign object insertion determination process (step 405) may be performed in a case in which such determination conditions are satisfied (step 403: YES and step 404: YES).

That is, typically, the child seat 10 is mounted on the seat 1 in a state in which the vehicle is stopped and a vehicle door adjacent to the child seat 10 is opened. Therefore, according to the configuration, it is possible to more precisely determine the foreign object insertion state.

In addition, the processes of steps 401, 402, and 405 in the flowchart in FIG. 7 are identical to the processes of steps 101 to 103 in the flowchart in FIG. 4. In addition, in this example, the vehicle stop state determination in step 403 may be performed using, for example, the ignition signal Sig, the parking signal Spk, or the like. Further, the vehicle door open state determination in step 404 may be performed based on the door opening and closing signal Sdo or the like.

In addition, the vehicle stop state determination and the vehicle door open state determination may be performed in the process of the foreign object insertion determination in step 103 in the flowchart in FIG. 4. In addition, any one of the vehicle stop state determination and the vehicle door open state determination may be performed. Further, in addition to the vehicle stop state determination and the vehicle door open state determination, vehicle state determination may be added to the condition for determining the foreign object insertion state.

The seating detection device 40 may be disposed in a front passenger seat and a rear seat.

The configuration of the pressure sensitive sensor 52 may be arbitrarily changed by providing a pressure sensitive switch unit in addition to a membrane switch or a contact point switch.

The pressure sensitive sensor 52 may be disposed inside the seat skin 2s that constitutes the seating surface S of the seat 1. For example, the pressure sensitive sensor 52 may be provided between a cushion pad and the seat skin 2s that constitutes the seating surface S, or between the cushion pad and a support member (e.g., a cushion pan or a so-called S spring) of the cushion pad.

Next, the technical spirit capable of being grasped from the aforementioned exemplary embodiment will be described.

It is preferable that a seating detection method according to an aspect of this disclosure includes: detecting whether a seat belt sensor provided in a seat of a vehicle is in an ON state or an OFF state; detecting whether a pressure sensitive sensor configured to be provided inside a seat skin constituting a seating surface of the seat is in an ON state or an OFF state; and determining a foreign object insertion state in which a foreign object is inserted between the seating surface and a child seat based on whether the seat belt sensor is in the ON state or the OFF state and whether the pressure sensitive sensor is in the ON state or the OFF state, in which, when the pressure sensitive sensor is changed from the ON state to the OFF state in a state in which the seat belt sensor is maintained in the ON state after the seat belt sensor is changed to the ON state, it is determined as the foreign object insertion state.

Typically, when mounting a child seat on a seat, an operator binds the child seat by a seat belt. Further, in that case, the seat belt sensor is turned into the ON state when the tongue plate of the seat belt is engaged with a buckle. In addition, at this time, when a foreign object is inserted between the child seat and the seating surface, the foreign object presses the seating surface by a load applied from the child seat such that the pressure sensitive sensor is changed from the OFF state to the ON state. Thereafter, when the child seat is completely mounted on the seat, a load, which presses the seating surface of the seat downward, is decreased. Therefore, the pressure sensitive sensor is changed from the ON state to the OFF state. That is, in this case, the pressure sensitive sensor is changed from the ON state to the OFF state in a state in which the ON state is maintained after the seat belt sensor is in the ON state.

Meanwhile, in a case in which an adult occupant is seated on the seat and in a case in which the child seat is mounted on the seat in a state in which no foreign object is inserted into a gap between the child seat and the seating surface, the ON/OFF state of the pressure sensitive sensor is not changed as the seat belt sensor is maintained in the ON state.

Therefore, with the configuration, by a simple configuration, it is possible to precisely determine the foreign object insertion state. Further, therefore, it is possible to inhibit incorrect detection, so that more precise occupant detection can be performed.

In the seating detection method, it is preferable that, when the pressure sensitive sensor is changed from the ON state to the OFF state and then changed again from the OFF state to the ON state in the state in which the seat belt sensor is maintained in the ON state after the seat belt sensor is changed to the ON state, it is determined that it is the foreign object insertion state.

In most cases, the operator, who mounts the child seat, binds the child seat by the seat belt in a state in which the tongue plate of the seat belt is engaged with the buckle. Further, therefore, the load, which presses the seating surface of the seat downward, occurs. That is, in a case in which the child seat is mounted on the seat in the foreign object insertion state, a timing at which the pressure sensitive sensor is changed from the OFF state to the ON state frequently exists after the seat belt sensor is changed to the ON state. Therefore, by adopting the configuration, it is possible to more precisely determine the foreign object insertion state.

In the seating detection method, it is preferable that, when the pressure sensitive sensor is changed to the OFF state from the ON state and then changed to the ON state, it is determined that it is the foreign object insertion state.

As the occupant (child) is seated on the child seat after the child seat is completely mounted on the seat, the load of the child seat, which presses the seating surface downward, is increased again. Further, at this time, when the foreign object is inserted between the child seat and the seating surface, the pressure sensitive sensor is changed from the OFF state back to the ON state. Therefore, by adopting the configuration, it is possible to more precisely determine the foreign object insertion state.

It is preferable that the seating detection method further includes determining whether the vehicle is in a vehicle stop state, and, when it is determined that the vehicle is in the vehicle stop state, it is determined that it is the foreign object insertion state.

Typically, the child seat is mounted on the seat in a state in which the vehicle is stopped. Therefore, by adopting the configuration, it is possible to more precisely determine the foreign object insertion state.

It is preferable that the seating detection method further includes determining whether a vehicle door is in an open state, and when it is determined that the vehicle door is in the open state, it is determined that it is the foreign object insertion state.

Typically, the child seat is mounted on the seat in a state in which a vehicle door adjacent to the child seat is opened. Therefore, by adopting the configuration, it is possible to more precisely determine the foreign object insertion state.

In the seating detection method, it is preferable that, when the pressure sensitive sensor is changed from the OFF state to the ON state before the seat belt sensor is changed to the ON state, it is determined that it is the foreign object insertion state.

It is preferable that a seating detection device according to an aspect of this disclosure includes: a buckle engagement detecting unit that detects whether a seat belt sensor provided in a seat of a vehicle is in an ON state or an OFF state; a seating detecting unit that detects whether a pressure sensitive sensor configured to be provided inside a seat skin which constitutes a seating surface of the seat is an ON state or an OFF state; and a foreign object insertion determining unit that determines a foreign object insertion state in which a foreign object is inserted between the seating surface and a child seat based on whether the seat belt sensor is in the ON state or the OFF state and whether the pressure sensitive sensor is in the ON state or the OFF state, in which, when the pressure sensitive sensor is changed from the ON state to the OFF state in a state in which the seat belt sensor is maintained in the ON state after the seat belt sensor is changed to the ON state, it is determined as the foreign object insertion state.

According to the configuration described above, it is possible to precisely detect, with a simple configuration, the foreign object insertion state in which a foreign object is inserted between the seating surface and the child seat.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seating detection method comprising:
    detecting whether a seat belt sensor configured to be provided in a seat of a vehicle is in an ON state or an OFF state;
    detecting whether a pressure sensitive sensor configured to be provided inside a seat skin constituting a seating surface of the seat is in an ON state or an OFF state; and
    determining a foreign object insertion state in which a foreign object is inserted between the seating surface and a child seat based on whether the seat belt sensor is in the ON state or the OFF state and whether the pressure sensitive sensor is in the ON state or the OFF state,
    wherein, when the pressure sensitive sensor is changed from the ON state to the OFF state in a state in which the seat belt sensor is maintained in the ON state after the seat belt sensor is changed to the ON state, it is determined as the foreign object insertion state.

2. The seating detection method according to claim 1, wherein, when the pressure sensitive sensor is changed from the ON state to the OFF state and then changed from the OFF state to the ON state in the state in which the seat belt sensor is maintained in the ON state after the seat belt sensor is changed to the ON state, it is determined that it is the foreign object insertion state.

3. The seating detection method according to claim 1, wherein, when the pressure sensitive sensor is changed to the OFF state from the ON state and then changed to the ON state, it is determined that it is the foreign object insertion state.

4. The seating detection method according to claim 1, further comprising:
    determining whether the vehicle is in a vehicle stop state,
    wherein, when it is determined that the vehicle is in the vehicle stop state, it is determined that it is the foreign object insertion state.

5. The seating detection method according to claim 1, further comprising:
    determining whether a vehicle door is in an open state,
    wherein, when it is determined that the vehicle door is in the open state, it is determined that it is the foreign object insertion state.

6. The seating detection method according to claim 1, wherein, when the pressure sensitive sensor is changed from the OFF state to the ON state before the seat belt sensor is changed to the ON state, it is determined that it is the foreign object insertion state.

7. A seating detection device comprising
    a seat belt sensor;
    a pressure sensitive sensor; and
    circuitry configured to:
    detect whether the seat belt sensor configured to be provided in a seat of a vehicle is in an ON state or an OFF state;
    detect whether the pressure sensitive sensor configured to be provided inside a seat skin which constitutes a seating surface of the seat is an ON state or an OFF state; and
    detect a foreign object insertion state in which a foreign object is inserted between the seating surface and a child seat based on whether the seat belt sensor is in the ON state or the OFF state and whether the pressure sensitive sensor is in the ON state or the OFF state,
    wherein, when the pressure sensitive sensor is changed from the ON state to the OFF state in a state in which the seat belt sensor is maintained in the ON state after the seat belt sensor is changed to the ON state, it is determined as the foreign object insertion state.

* * * * *